Patented Apr. 20, 1926.

1,581,224

UNITED STATES PATENT OFFICE.

JAMES ALEXANDER SHEPHERD MORRISON, OF GRAPPENHALL, ENGLAND.

TANNING AND THE MANUFACTURE OF TANNING MATERIALS.

No Drawing. Application filed January 23, 1924. Serial No. 688,096.

*To all whom it may concern:*

Be it known that I, JAMES ALEXANDER SHEPHERD MORRISON, a subject of the King of Great Britain, residing in Grappenhall, in the county of Chester and Kingdom of England, have invented certain new and useful Improvements in Tanning and the Manufacture of Tanning Materials, of which the following is a specification.

This invention relates to an improved process of tanning and to certain novel tanning liquors and the manufacture thereof.

In the process of making tanning extracts the vegetable raw material is usually extracted with water and the resulting liquor is then concentrated to a suitable strength. In this process there is a considerable amount of insoluble matter which is rejected as spent tan. Much of this spent tan consists of cellulosic matter. During the extraction of the soluble matter there is also extracted a considerable amount of difficultly soluble matter which slowly precipitates and is filtered from the extract at various stages in the process. This so called insoluble matter will tan but is rejected because owing to the size of the particles it will not penetrate the hide or skin and remains on the surface as a sludge. Such insoluble matter or sludge is produced from all types of tanning materials, pyrogallol tannins giving what is known as bloom, whilst catechol tannins give insoluble reds or phlobaphenes. Also the production of these insolubles does not cease after the extract is made but is active when these materials are diluted with water to form the usual tanning liquor, or when such a liquor is made directly from tanning materials without concentration. This insoluble sludge formed either during extraction or during the tanning process is generally rejected and cannot be used.

Thus tanning liquors (including the fresh tanning extracts or the partially exhausted liquors) contain soluble matter in the form of tans and non-tans, but insoluble matter is often precipitated in the form of sludge e. g. by concentration of an extract or by the action of bacteria and the like, during the actual process of tanning.

According to my invention I tan hides with a liquor containing insoluble or difficultly soluble matter which has been mechanically colloidalized. Thus I prepare tanning liquors by dispersing insoluble matter in the liquor by the operation of mechanical colloidalization which may be performed in a high-speed disintegrator. I may disperse the original raw material or the spent tan in water or in a tanning liquor (natural or synthetic) or I may disperse the sludge (formed from an extract or a mixture of extracts and/or from a used tanning liquor) in the liquor from which it has been precipitated or in water or another liquor.

The invention also includes the process of preparing tanning liquors by blending highly astringent tans with liquors having an abnormally high ratio of (colloidal) non-tans to tans.

The invention further includes the novel tanning liquors containing an abnormally high ratio of (colloidal) non-tans to tans and the blended liquors obtained as above described.

In a preferred form of the invention the vegetable material is disintegrated in presence of the necessary quantity of water or even of tan liquor under conditions leading to the dispersal of the material into the colloidal state. The vegetable material may be ground or disintegrated as such or the solution may be made separately after grinding to the colloid state has taken place. Alternatively, preliminary grinding or selection of the material may be effected before grinding with water. In this manner much of the cellulosic constituents of the tanning material can be dispersed to the colloidal state, and are then capable of being absorbed by hide or skin.

In an alternative process where it may not be desirable or necessary to disperse the cellulosic matter the extraction of tanning material may proceed in the usual manner by leaching with water but without filtration of the insoluble matter which deposits from solution before concentration in an evaporator. The concentrated extract may then be treated in a disintegrator or similar machine under conditions which will lead to dispersion of the insoluble matter to the colloidal state.

Bleaching agents such as sodium bisulphite or synthetic tans may be added.

Similarly during the process of tanning I take a liquor which has deposited insoluble matter, reds and/or bloom and treat the liquor and the sludge in a disintegrator or similar machine under conditions which will disperse the sludge to a colloidal solution. The solution can then be used for treating further packs of hides.

The disintegrator which is used in the process may be one of many well-known types such as the Hurrel homogenizer, the Premier mill, the Plauson mill, etc. During disintegration in these or other mills it may be necessary to add chemical compounds which will act as stabilizers. This depends upon the particular material being treated but in the case of many materials the addition of such a stabilizer is not necessary since the tannins themselves are known to act as stabilizers or peptizers for colloidally dispersed substances.

The effect of my invention on the process of making tanning liquors and on the tanning process will be seen to be very great. The tannins used commercially vary considerably in their astringency. Some astringent tans can be used only at one stage of the process whilst other mellow tans are more suitable for use at other stages. It is a general but not absolute rule that the more astringent tans contain a larger proportion of soluble tans compared with the soluble non tans than do the more mellow tanning materials. The rather wide variations in the behaviour of tanning extracts may be due to differences in the state of dispersion of the matters extracted from the original material and in some materials the real tannin may thus be more effectively protected than in others. These protecting substances may be preferentially absorbed by the pelt and thus prevent the too rapid action of the tanning. In my process I am able to disperse matters associated with the astringent tans and thus render them less astringent and suitable for more varied use.

In the practical application of my invention the process varies according to the material treated, but I give the following example of procedure. The tanning material myrabolams is first disintegrated in an ordinary disintegrator until the ground material will pass through a 20 mesh sieve. The dry powder is then mixed with five times its weight of water, heated to not more than 70° C. and after stirring for some time is then passed through another mill or disintegrator which will grind the whole colloidally. The liquid is passed through this mill some three or four times and is then filtered from the coarse fibrous particles, preferably by pressing. The resulting liquor is again used to treat a further portion of dry powder and after agitating is passed through the colloidal mill. This liquor is in turn filtered and the filtrate treated with a further portion of powder. This extraction is carried on in a number of stages, the liquor being kept warm at 70° C. until the resulting liquor is sufficiently strong. This strong liquor is then finally passed through the colloidal mill until the flocculated particles are dispersed. In actual practice I find that the filtered coarse particles retain some of the liquid and it is necessary to wash the pressed cake with water to recover some tan. In a second series of operations I then use this wash water to extract new material and proceed as before. The number of stages necessary in the process depends upon the type of liquor required. Thus, taking the extraction to three stages I am able to make a liquor containing:—soluble tans 14.3, soluble non-tans 7.5, insoluble matter 3.8, water 74.4.

The ratio $\frac{\text{tans}}{\text{non-tans}}$ is equal to 1.9:1. An ordinary myrabolum extract will contain tans and non-tans in the ratio 2.4:1 and it will thus be seen that the ratio of non-tans to tans is abnormally high as I am able to render soluble some of the non-tans which are usually rejected in the process of extract manufacture.

Certain raw materials (e. g. from Australia) yield highly astringent extracts which are unsuitable for tanning. According to my process I can reduce the astringency by blending an astringent extract with an extract containing an abnormal amount of non-tans, e. g. I may use an extract prepared by disintegrating a vegetable raw material in water for the purpose of reducing the astringency of an extract poor in non-tans. Or the raw materials may be mixed (before or during disintegration) i. e. I may disintegrate in water a mixture of a raw material (or an extract thereof) which would normally give an over-astringent product, and a solid containing sufficient cellulose to give non-tans to compensate for the excess astringency; this solid may be the vegetable raw material or the spent tan, for example. Or raw materials rich in cellulose may be disintegrated in presence of synthetic tans.

It will be seen that one form of my process has the advantage of avoiding extraction and vacuum evaporation which are replaced by a single process and this process can be performed at lower temperatures than are attained in evaporation. I thus get tanning liquors of a better colour than usual. A typical colour test of an ordinary myrabolam extract is:—1.7 units red, 5.5 units yellow.

The above liquor gave:—0 units red, 2.1 units yellow.

The tanning extracts so obtained containing tans and a large quantity of dispersed cellulosic and other colloidal matter are considered to be novel since the cellulosic and other matter is dispersed mechanically and does not appear to be broken down chemically so that my extracts differ from mixtures of tanning materials with starch or hemi-cellulose or sulphite cellulose.

In referring to liquors containing an abnormally high amount of natural non-tans I distinguish from liquors containing added starch hemi-cellulose or the like.

The process of tanning according to the present invention consists in treating the pelt with the colloidal solution containing the cellulosic and other constituents of the plant which are usually insoluble or are rendered insoluble after extraction or during the tanning process.

As described above, the liquor may be disintegrated with the sludge at intervals during the whole process.

When the leather is dried the absorbed tanning material is more thoroughly fixed against the absorbent action of water (since the dispersed cellulosic and other matter is then precipitated or flocculated) than is the case with ordinary leather.

In the claims, I employ the expression difficultly soluble to include materials which are ordinarily called insoluble as well as those which dissolve but with difficulty. The expression aqueous medium is employed to include water or a tanning liquor.

By the term an abnormally high ratio of non-tans to tans, I mean a ratio which is substantially greater than the ratio found in an extract of the same vegetable raw material prepared without the aid of mechanical colloidalization, e. g. in the case of myrabolam extract I mean an extract containing substantially more than 1 part of non-tans to every 2.4 parts of tans. Naturally this ratio varies with the raw material in question, but the mechanical colloidalization produces a liquor containing relatively more non-tan.

I declare that what I claim is:

1. The process of tanning hides by treating them with a liquor containing difficultly soluble matter which has been colloidalized by mechanical disintegration.

2. The process of tanning hides by treating them with a liquor prepared by mechanical colloidalization and containing an abnormally high ratio of natural non-tans to tans.

3. The process of preparing tanning liquors which consists in mechanically colloidalizing difficultly soluble ingredients of the raw material in an aqueous medium.

4. The process of preparing tanning extracts which comprises subjecting a mixture of an aqueous medium and vegetable raw material to such mechanical disintegration that part or all of the cellulose is colloidalized.

5. The process of preparing tanning extracts which comprises leaching the vegetable raw material and subjecting the extract to such mechanical disintegration as to convert the insoluble matter into the colloidal form.

6. The process of preparing tanning liquors by mechanically colloidalizing in an aqueous medium a difficultly soluble material derived from a vegetable tanning material.

7. The process of tanning in which the step of claim 6 is interpolated between an earlier and a later stage of treatment of hides so that in the latter stage the hides are treated with the mechanically colloidalized liquor.

8. The process of preparing tanning liquors by blending an astringent tan with a tanning liquor prepared by mechanical colloidalization and containing an abnormally high ratio of non-tans to tans.

9. A process as claimed in claim 8 in which the blending is performed at the same time as the dissolving of the astringent tan or the less astringent material.

10. Tanning extracts containing an abnormally high ratio of natural partly colloidal non-tans to tans.

In witness whereof, I have hereunto signed my name this 31st day of December 1923.

JAMES ALEXANDER SHEPHERD MORRISON.